Sept. 4, 1962   D. R. KERSTETTER   3,052,015
HIGH CONDUCTIVITY ANODE MATERIAL

Filed Nov. 20, 1956

INVENTOR
DONALD R. KERSTETTER

BY Michael Hertz
ATTORNEY

United States Patent Office 3,052,015
Patented Sept. 4, 1962

3,052,015
HIGH CONDUCTIVITY ANODE MATERIAL
Donald R. Kerstetter, Emporium, Pa., assignor, by mesne assignments, to Sylvania Electric Products Inc., Wilmington, Del., a corporation of Delaware
Filed Nov. 20, 1956, Ser. No. 623,410
3 Claims. (Cl. 29—195)

The invention relates to laminated sheet material for use in electron tubes as electrode elements, particularly for use as anode material.

The anode in an electron tube conducts a fair amount of current and if made of a poor conductor will provide a considerable power loss within the tube coupled with the creation of undesired heat, over and above that created by the bombardment of the anode by the electrons emitted from the cathode. The requirements of an anode are that it shall be a good conductor, a good radiator of heat and of course economical in the use and cost of material. Other requirements are that the anode shall not be impaired or destroyed during tube manufacture, at which time the electrode elements within the tube are subjected to temperatures greatly above those encountered by these same elements during normal tube use.

The usual electrode material employed in electron tubes is nickel because of its resistance to destruction by heat and because of its conductivity or is made of laminated materials such as a layer of nickel sandwiched in between two thin coatings of copper or a layer of iron with a thin coating of copper. While these laminated materials may be efficacious at ultra high frequencies where the skin effect concentrates the current within the surface of the materials and where the current density is not high, they are not suitable for use at the frequencies normally employed in radio and television receivers.

It is an object of the invention to provide a laminated material which shall have the desirable characteristics of being highly conductive at the frequencies encountered in radio and television apparatus, be highly dissipative of heat, economical in use of materials, and low in cost of these materials.

Figure 1:
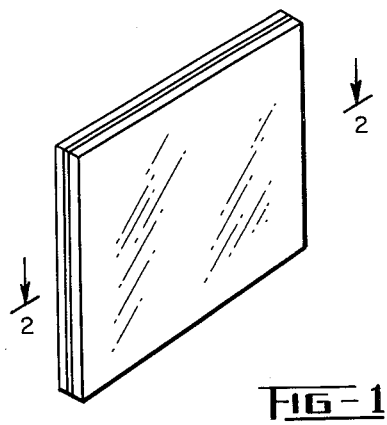
Figure 2:
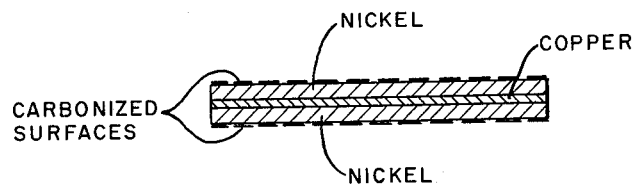

Referring to the drawing which forms part of this disclosure, FIGURE 1 is a perspective view of a laminated structure embodying the materials of the invention and FIGURE 2 is a cross section thereof.

As will be seen from the drawing the laminated material comprises a center sheet of a highly electro-conductive material, such as copper, sandwiched in between two sheets of more rigid, more heat resistant, and less electro-conductive material, such as nickel. The nickel sheets are carbonized on their outer surfaces. The bonding of the sheets to each other may be effected in any conventional fashion. The thickness of each of the nickel laminations should be about the same and about twice that of the copper. In a contemplated use of the invention as anode material the copper is about .001 inch thick and the nickel sheets .002 inch thick. A sandwich of nickel-copper-nickel with each lamination of the nickel .002 inch thick and the copper .001 inch thick will provide a thermal conductivity equivalent to nickel stock .009 inch thick. This is because of a 5 to 1 ratio in thermal conductivity of copper over nickel; also since copper is a much better conductor of electricity than nickel, the copper layer, and the confining layers will afford a much better conduction for the current flowing through the material than an equal thickness of nickel. As excessive thickness of copper is undesirable since there is then promoted difficulties in welding of the laminations together in R.F. heating of the laminated structure to drive out the occluded gasses during tube manufacture, and in strength of the composite structure. Therefore, the thickness of the copper should not be much more than twice the thickness given above. As anode material, the exteriors of the nickel laminations may be carbonized in any manner known to the art.

Having thus described this invention what is claimed as new is:

1. Anode material comprising a layer of copper about .001 inch thick bonded in between two layers of nickel, with each nickel layer about .002 inch thick.

2. A laminated structure for use as an anode within an electron tube comprising a layer of a metallic highly electro-conductive material bonded in between two layers of high temperature resistant and less conductive, more rigid metallic material and a black coating of carbon on exposed faces of the more rigid material.

3. Anode material comprising metallic materials and a carbon coating, the metallic materials comprising solely three distinct layers of material bonded together, the two outer metallic layers being of nickel and the one intermediate layer being of copper, and a black coating on the exposed faces of the nickel layers.

References Cited in the file of this patent
UNITED STATES PATENTS

| | | |
|---|---|---|
| 836,339 | Pedersen | Nov. 20, 1906 |
| 890,895 | Fery | June 16, 1908 |
| 1,927,812 | Thomson | Sept. 19, 1933 |
| 1,956,818 | Acre | May 1, 1934 |
| 2,120,561 | Laise | June 14, 1938 |
| 2,299,184 | Slepian | Oct. 20, 1942 |
| 2,301,320 | Phillips | Nov. 10, 1942 |
| 2,391,455 | Hensel | Dec. 25, 1945 |
| 2,428,033 | Nachtman | Sept. 30, 1947 |
| 2,471,663 | Tietz | May 31, 1949 |
| 2,524,263 | Kingston | Oct. 3, 1950 |
| 2,688,182 | Dorst | Sept. 7, 1954 |
| 2,878,410 | Millis | Mar. 17, 1959 |